(12) United States Patent
Loke

(10) Patent No.: US 8,012,397 B2
(45) Date of Patent: Sep. 6, 2011

(54) BLADDER-MOLDED FISHING ROD AND METHOD OF MANUFACTURING SAME

(76) Inventor: Swee Leong Loke, Singapore (SG)

( * ) Notice: Subject to any disclaimer, the term of this patent is extended or adjusted under 35 U.S.C. 154(b) by 0 days.

(21) Appl. No.: 12/552,232

(22) Filed: Sep. 1, 2009

(65) Prior Publication Data

US 2009/0315225 A1     Dec. 24, 2009

Related U.S. Application Data

(62) Division of application No. 11/474,401, filed on Jun. 26, 2006, now abandoned.

(51) Int. Cl.
*B28B 7/32* (2006.01)

(52) U.S. Cl. ........ 264/314; 264/257; 264/258; 264/523; 264/527

(58) Field of Classification Search .................. 264/314, 264/257–258, 523, 527
See application file for complete search history.

(56) References Cited

U.S. PATENT DOCUMENTS

| | | |
|---|---|---|
| 1,293,208 A | 2/1919 | Ryan |
| 3,513,582 A | 5/1970 | Carabasse |
| 4,422,259 A | 12/1983 | Shimano |
| 4,686,787 A | 8/1987 | Whipp |
| 4,860,481 A | 8/1989 | Christenson |
| 4,920,682 A | 5/1990 | Andreasen et al. |
| 4,962,608 A | 10/1990 | Loomis et al. |
| 5,229,187 A | 7/1993 | McGinn |
| 6,145,237 A * | 11/2000 | Young ........................ 43/18.1 R |
| 6,148,558 A | 11/2000 | Ono et al. |
| 6,286,244 B1 | 9/2001 | Weiss |
| 2001/0008659 A1* | 7/2001 | Nelson et al. ................ 428/35.2 |
| 2002/0092225 A1 | 7/2002 | Watanabe |
| 2003/0071388 A1* | 4/2003 | Iwasaki ........................... 264/85 |
| 2005/0193617 A1 | 9/2005 | Ryan |
| 2006/0185218 A1 | 8/2006 | Whiting |
| 2008/0168699 A1 | 7/2008 | Gazzara |

FOREIGN PATENT DOCUMENTS

JP     1-304931 A     12/1989

* cited by examiner

*Primary Examiner* — Yogendra N Gupta
*Assistant Examiner* — Amjad Abraham
(74) *Attorney, Agent, or Firm* — Birch, Stewart, Kolasch & Birch, LLP (57) ABSTRACT

A method of forming a fishing rod with at least one integrally formed support includes providing a bladder over a mandrel, wrapping a resin-impregnated material over the bladder to provide a wrapped resin-impregnated material, removing the mandrel from the wrapped resin-impregnated material, folding the wrapped resin-impregnated material onto itself at least once to form a tubular body, wherein folding the wrapped resin-impregnated material forms at least two separate bladder portions and the integrally formed support within the tubular body, placing the tubular body into a mold, and molding the tubular body to provide the fishing rod with the integrally formed support.

7 Claims, 7 Drawing Sheets

BLADDER-MOLDED FISHING ROD AND METHOD OF MANUFACTURING SAME

CROSS-REFERENCE TO RELATED APPLICATIONS

This application is a divisional of prior application Ser. No. 11/474,401, filed Jun. 26, 2006, now abandoned, which is herein incorporated by reference in its entirety and for which priority is claimed under 35 U.S.C. §120.

BACKGROUND OF THE INVENTION

1. Field of the Invention

The present invention is directed, in general, to a bladder-molded fishing rod, and more specifically, to a bladder-molded fishing rod having an integrally formed support.

2. Description of Related Art

Conventional tubular fishing rods are manufactured by wrapping an appropriate material around a steel mandrel and baking the wrapped mandrel in an oven until it is cured. After curing, the mandrel is removed and the rod is finished by conventional means. As such, conventional tubular fishing rods are restricted in design by the shape of the mandrel. In addition, such rods are hollow without any internal support to provide additional strength.

U.S. Pat. No. 6,145,237 discloses a one-piece fishing rod that attempts to improve on conventional fishing rods by using bladder molding to form the rod. However, the fishing rod taught by U.S. Pat. No. 6,145,237 requires that an internal rib be loosely assembled inside an expandable rod sock along with two separate bladders. As a result, uniform pressure in both bladders is used to align the rib in the rod sock prior to and during curing. As such, an additional step of inserting the rib and bladder portions into the rod sock is required.

Therefore, there is a need for a bladder-molded fishing rod that is formed with an integral support where the integrally formed support may be more reliably located within the fishing rod while minimizing the assembly steps of the fishing rod.

BRIEF SUMMARY OF THE INVENTION

According to an embodiment of this invention, a fishing rod having an internal support is provided. In one aspect, the present invention is directed to a fishing rod including a tubular body where the tubular body is folded over at least once into a contact relationship with itself to define at least a first hollow portion and a second hollow portion. At least one support is formed integral to the tubular body and the support separates the first hollow portion and the second hollow portion.

In another aspect, the present invention is directed to a fishing rod having a tubular body formed by providing a bladder over a mandrel, wrapping a resin-impregnated material over the bladder to provide a wrapped resin-impregnated material, removing the mandrel from the wrapped resin-impregnated material, folding the wrapped resin-impregnated material onto itself at least once to form the tubular body having at least two separate bladder portions and at least one integrally formed support, and curing the tubular body in a mold.

In yet another aspect, the present invention is directed to a method of forming a fishing rod. The method includes providing a bladder over a mandrel, wrapping a resin-impregnated material over the bladder to provide a wrapped resin-impregnated material, removing the mandrel from the wrapped resin-impregnated material, folding the wrapped resin-impregnated material onto itself at least once to form a tubular body. In the process of the folding the wrapped resin-impregnated material, at least two separate bladder portions and the at least one integrally formed support are formed within the tubular body. The method further includes placing the tubular body into a mold and molding the tubular body to provide the fishing rod with the integrally formed support.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

FIGS. 1 and 2A-2C show an exemplary fishing rod 10 according to principles of the invention. As shown in the figures, fishing rod 10 includes a tubular body 12 that has a handle portion 14, a rod portion 16, and a tip 18. A transition portion 15 connects the handle portion 14 to the rod portion 16. In the exemplary embodiment shown, the handle portion 14 may be about 58 cm long, the rod portion 16 and tip 18 may be about 104 cm long, and the transition region between handle portion 14 and rod portion 16 may be about 40 cm long.

Figure 1:
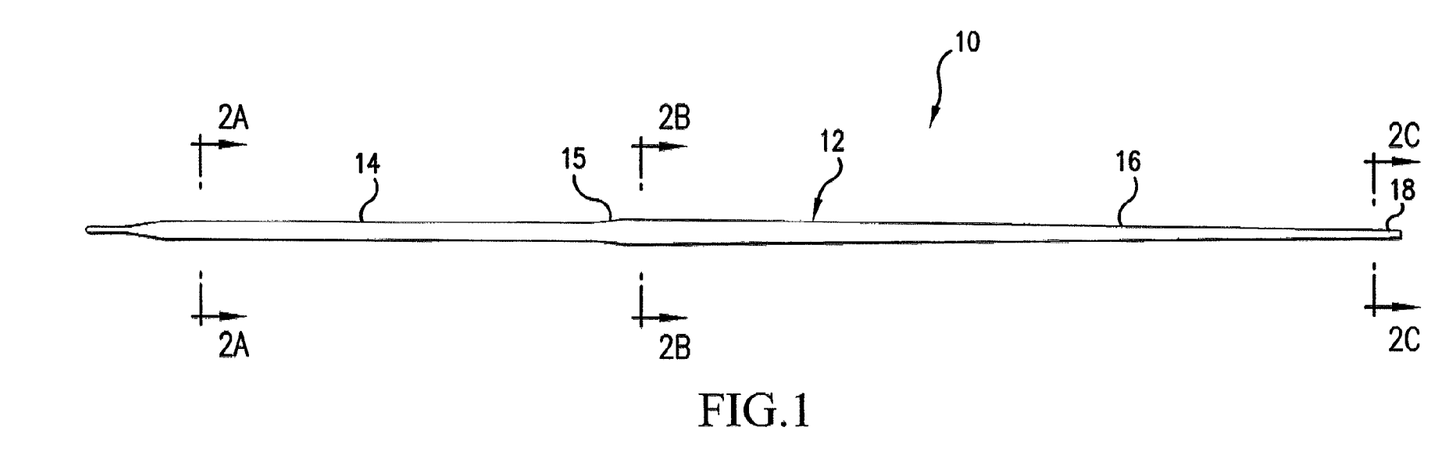
FIG. 1 is a profile view of a fishing rod according to an exemplary embodiment of the present invention.
Figure 2A:
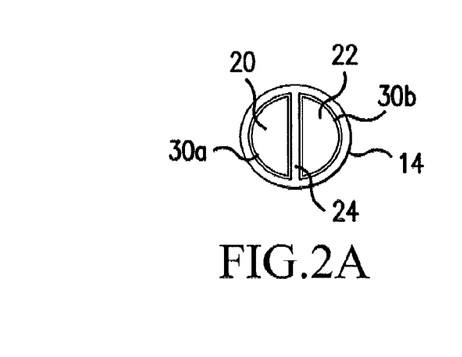
FIGS. 2A, 2B, and 2C are cross-sectional views taken along lines 2A-2A, 2B-2B, and 2C-2C respectively of the fishing rod of FIG. 1.
Figures 2B, 2C:
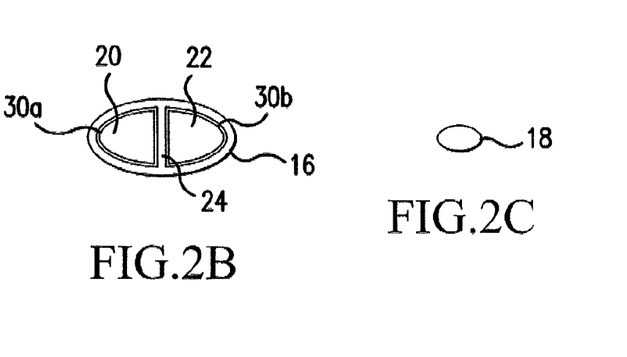

During formation of the fishing rod 10, tubular body 12 is folded over into a contact relationship with itself to define a first hollow portion 20 and a second hollow portion 22 (FIGS. 2A and 2B). A support 24 is formed integral to tubular body 12 as a result of the contact relationship and curing process. Support 24 separates first hollow portion 20 and second hollow portion 22.

As seen in FIGS. 2A and 2B, the cross-section of tubular body 12 may vary along the length of the body. For example, regarding handle portion 14, it may be desirable to provide a substantially circular cross-section having a diameter of approximately 2.4 cm. Rod portion 16 may have a substantially elliptical cross-section having the major axis oriented in a horizontal direction and the minor axis in a vertical direction. In the particular embodiment shown, tubular body 12 tapers along the length of the rod portion 116 towards tip 18. The elliptical cross-section at the largest point may have a major axis of 3.4 cm and a minor axis of 1.7 cm. Tip 18 may also be generally elliptical in shape (FIG. 2C) with a major axis of approximately 1 cm and a minor axis of approximately 0.5 cm. Although the tip is shown as being solid, it is understood that a hollow tip may also be provided.

Support 24 extends in a plane perpendicular to the major axis of the rod portion 16. This particular formation provides increased strength of fishing rod 10 over conventional hollow fishing rods because of the inclusion of the support. In addition, because the width of rod portion 16 (the major axis) is greater than the height of rod portion 16 (the minor axis), proper orientation of the fishing rod is achieved. Therefore, when a user is attempting to reel in a fish, the spine of the fishing rod will be properly aligned, thereby improving the balance and strength of the fishing rod.

Although the support 24 is shown extending along handle portion 14 and rod portion 16, it is understood that other arrangements may be provided. For example, the support may only extend the length of or only a portion of the length of rod portion 16 and not handle portion 14.

Figure 8:
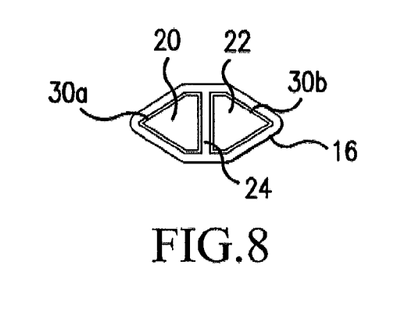
FIG. 8 is a cross-sectional view of another exemplary embodiment of the present invention.

Although fishing rod 10 has been described with reference to specific dimensions, fishing rods of many different sizes and cross-sections, such as, for example, oval, triangular, square, rectangular, hexagonal (FIG. 8), and other polygonal shapes, can be bladder molded. These bladder-molded fishing rods would be suitable for, but not limited to, the following applications: big game fishing, trolling, boat fishing, shore fishing, inshore fishing, coastal fishing, river fishing, lake fishing, fly fishing, jigging, popping, and ice fishing.

Figure 3A:
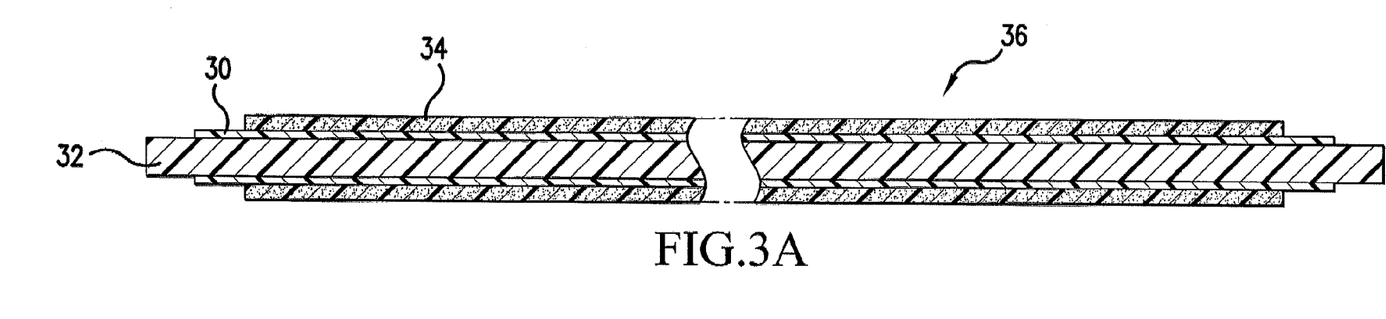
FIGS. 3A-3C are schematic views of an intermediary step of manufacturing the fishing rod of FIG. 1.
Figure 3B:
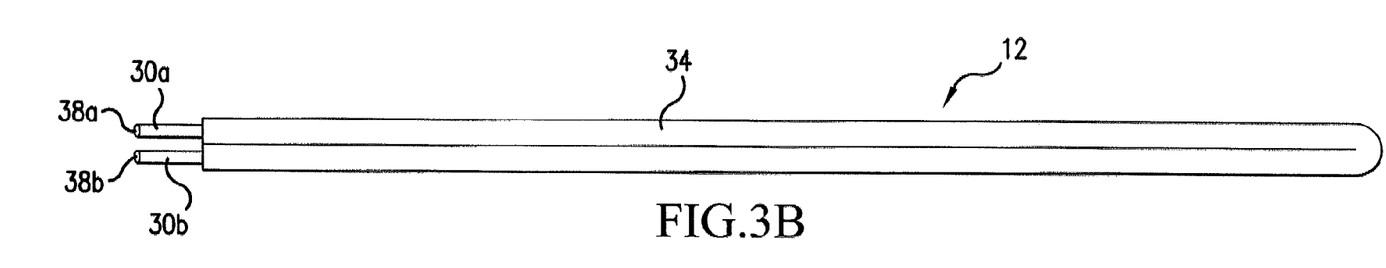
Figure 3C:
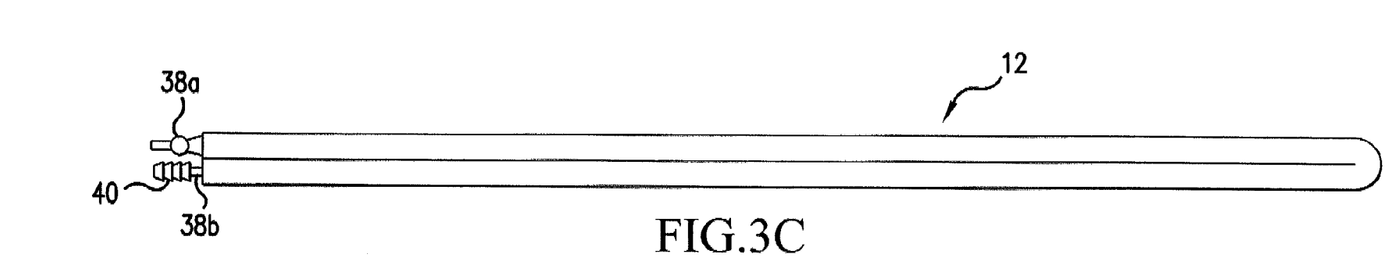
Figure 4A:
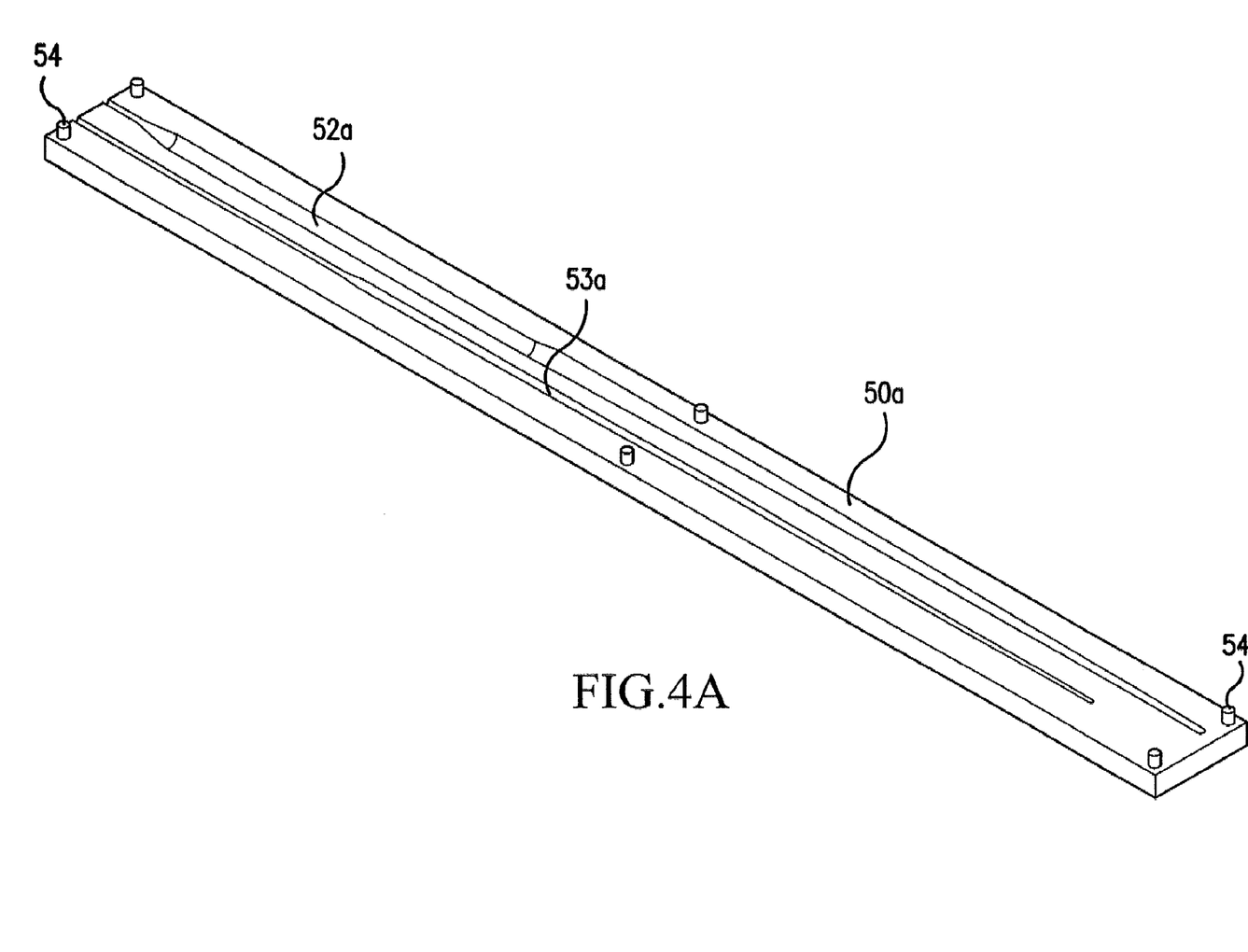
FIGS. 4A and 4B are perspective views of a top portion and bottom portion of a mold, respectively, used to manufacture the fishing rod of FIG. 1.
Figure 4B:
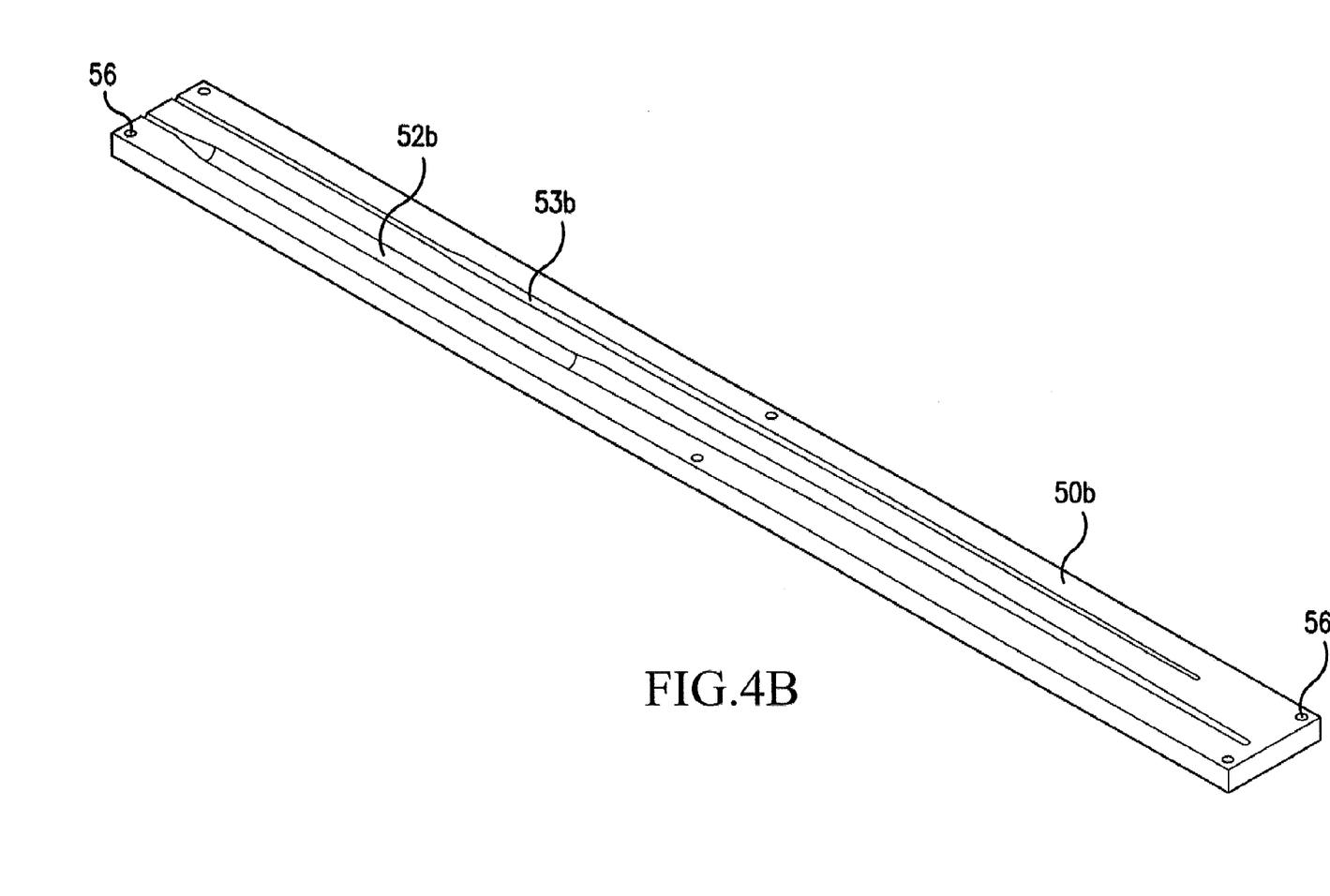
Figure 5:
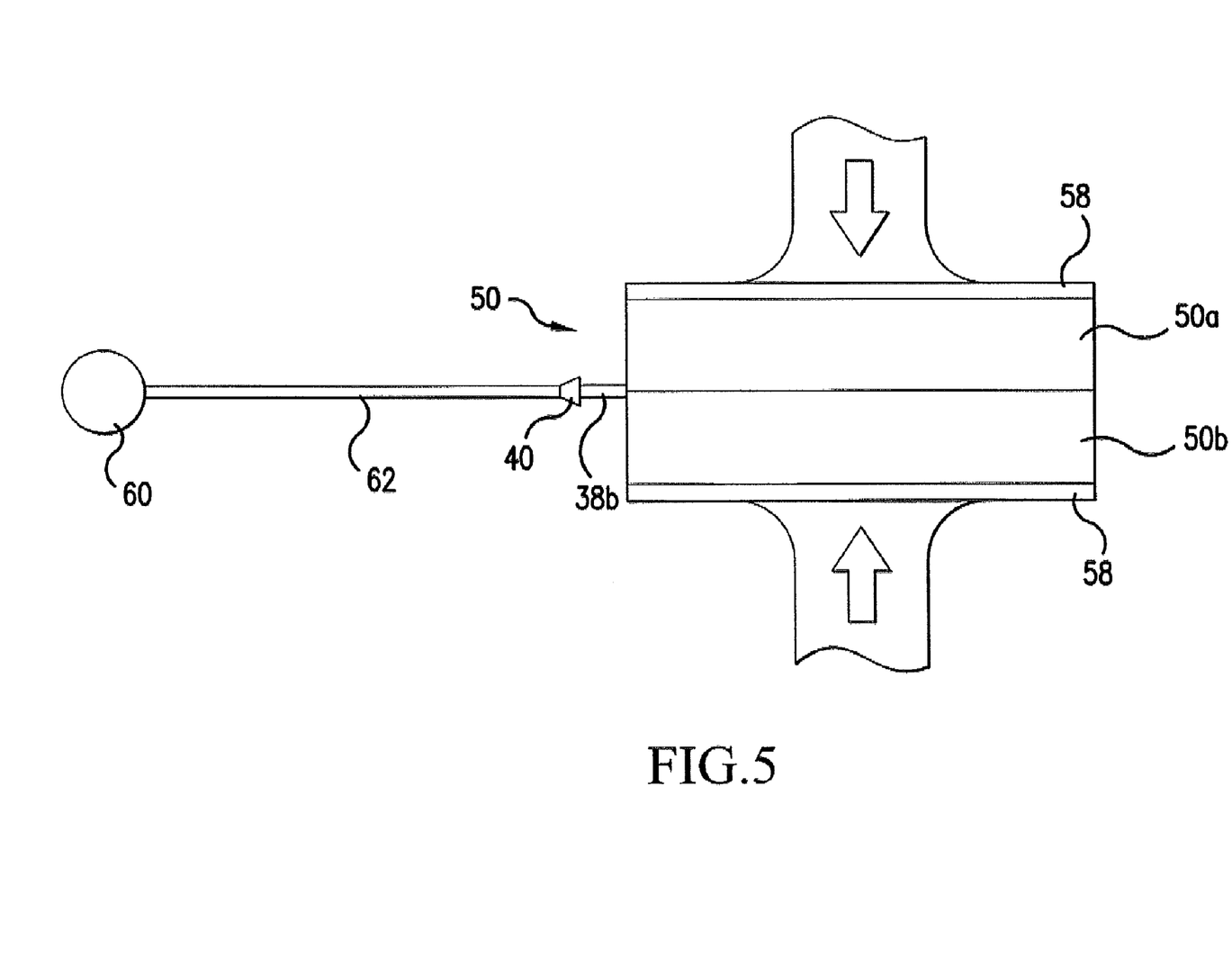
FIG. 5 is a schematic view of a mold during the manufacturing process.

The formation of exemplary fishing rod 10 will be explained with reference to the remaining figures. FIGS. 3A-3C show the intermediary steps of forming the tubular member 12 prior to placing it in a mold. FIGS. 4A and 4B show exemplary mold halves that are used to form fishing rod 10. Finally, FIG. 5 shows the tubular member 12 inserted into the assembled mold and being cured to create fishing rod 10.

As seen in 3A, the method of forming fishing rod 10 includes providing a bladder 30 over a mandrel 32 and wrapping a prepreg 34 over the bladder to provide a wrapped prepreg 36. The prepreg material 34 contains a resin-impregnated material, such as, fiberglass, carbon, graphite, Kevlar, boron, any other composite materials, or any combinations thereof. In addition, many different prepreg layers (not shown) may be used in forming the wrapped prepreg. Once wrapped prepreg 36 is formed, mandrel 32 may be removed from wrapped prepreg 36.

Next, as seen in 3B, wrapped prepreg 36 is folded onto itself to form tubular body 12. As a result of folding the wrapped prepreg 36, tubular body 12 includes two separate bladder portions 30a and 30b that are separated by the integrally formed support 24 within tubular body 12. Because of the wrapped prepreg 36 is folded onto itself, the support 24 is generally located in the middle of the tubular body 12. Additional prepreg layers (not shown) may be wrapped around tubular body 12 to further build up the tubular body and to assist in forming a solid tip if desired.

Each bladder portion 30a, 30b may have open ends 38a, 38b, respectively. If two open ends 38a, 38b, as shown in FIG. 3C, are provided, one of the ends 38a may be sealed by tying a knot and the other end 38b may be attached to a nozzle 40.

It is understood that open end 38a may be sealed by any variety of means. It is also understood that bladder 30 may have a single opening so that only one bladder portion 30b has an open end.

Next, tubular body 12 is placed into mold 50. As seen in FIGS. 4A and 4B, mold 50 includes first and second mold halves 50a, 50b. Cut-outs 52a, 52b are formed respective mold halves 50a, 50b such that the cut-outs define the exterior surface of fishing rod 10. Pins 54 are formed on first mold halve 50a and corresponding depressions 56 are formed in mold have 50b. Cut-outs 52a, 52b extend to the ends of mold halves 50a, 50b to allow bladder portion 30a and/or nozzle 40 to extend outside the mold 50. Once the tubular body 12 has been placed in mold 50, as shown in FIG. 5, the mold 50 is placed into a hot press 58 and a pressurized source 60, preferably air, is connected to nozzle 40 via line 62 to inflate both bladder portions 30a, 30b. In addition to cut-outs 52a and 52b, mold 50 may have cut-outs 53a and 53b to allow more than one fishing rod to be molded at a time. For example, cut-outs 52a and 52b may be appropriately sized for a trolling rod while cut-outs 53a and 53b may be appropriately sized for a light casting/spinning rod. Other appropriate cut-outs may be provided.

Finally, the tubular body 12 is molded to form fishing rod 10 using a curing process. During the curing process of the tubular member 12, the pressure from the pressurized source 60 expands each of the bladder portions 30a, 30b to define first and second hollow portions 20, 22 and to expand tubular body 12 to fill the cut-outs 52a, 52b in mold 50. Generally, the pressure from the pressurized source 60 to the nozzle 40 is maintained at about 40 bar. For example, during the first three minutes, the pressure supplied by nozzle 40 increases from zero bar to approximately 40 bar. Once the pressure at the nozzle 40 reaches 40 bar, that pressure is maintained for the duration of the curing process.

At the same time as pressure is supplied to the bladder portions 30a and 30b, the hot press 58 applies sufficient clamping pressure to hold the mold 50 closed. The hot press 58 is maintained at about 150° C. to transfer sufficient heat to mold 50. During the first three minutes, the temperature of the mold 50 is increased from about 80-100° C. to about 120° C.; from three to five minutes, the temperature of mold 50 increases from about 120° C. to about 130° C.; from five minutes to ten minutes, the temperature of mold 50 increases from about 130° C. to about 140° C.; from ten minutes to twenty minutes, the temperature of mold 50 increases from about 140° C. to about 145° C.; and, from twenty minutes to fifty minutes, the temperature of mold 50 is maintained at about 145° C. The curing process may vary depending on the prepreg material selected.

After the fishing rod 10 is cured, it is removed from the mold 50. At this time, the fishing rod 10 may be finished (e.g., providing a material around handle portion 14, attaching guides, forming a reel seat, etc.) using conventional means.

Figure 6A:
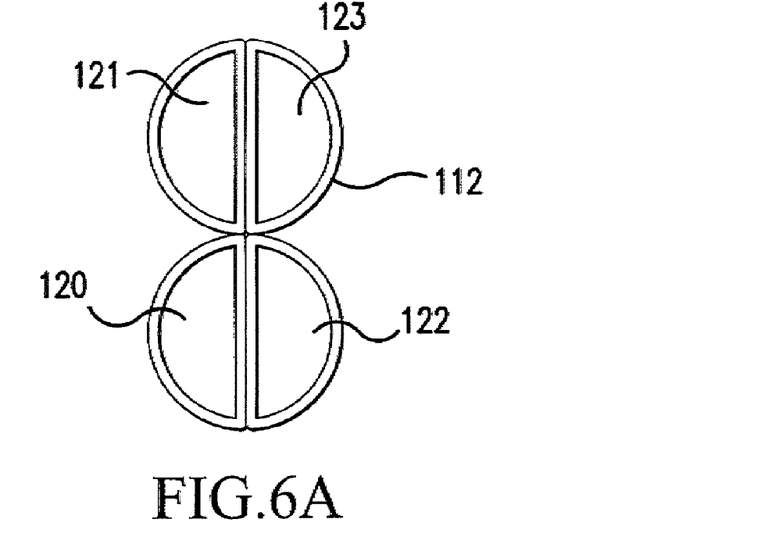
FIGS. 6A and 6b show sectional views of a fishing rod according to a second exemplary embodiment of the present.
Figure 6B:
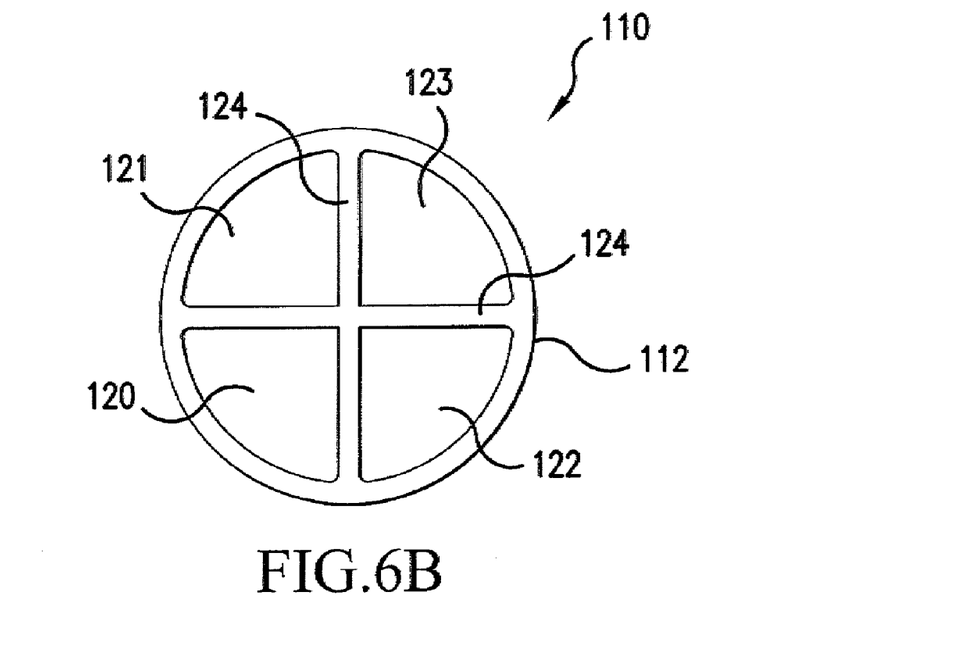

In a second exemplary embodiment, a fishing rod 110 may include more than one internal support. For example, as seen in FIGS. 6A and 6B, if tubular member 112 is folded a second time, two internal supports 124 can be formed, thereby creating four hollow portions 120, 121, 122, and 123. Additional supports can be provided by further folding tubular member 112. Bladder portions have not been shown in FIGS. 6A and 6B for clarity.

Figure 7:
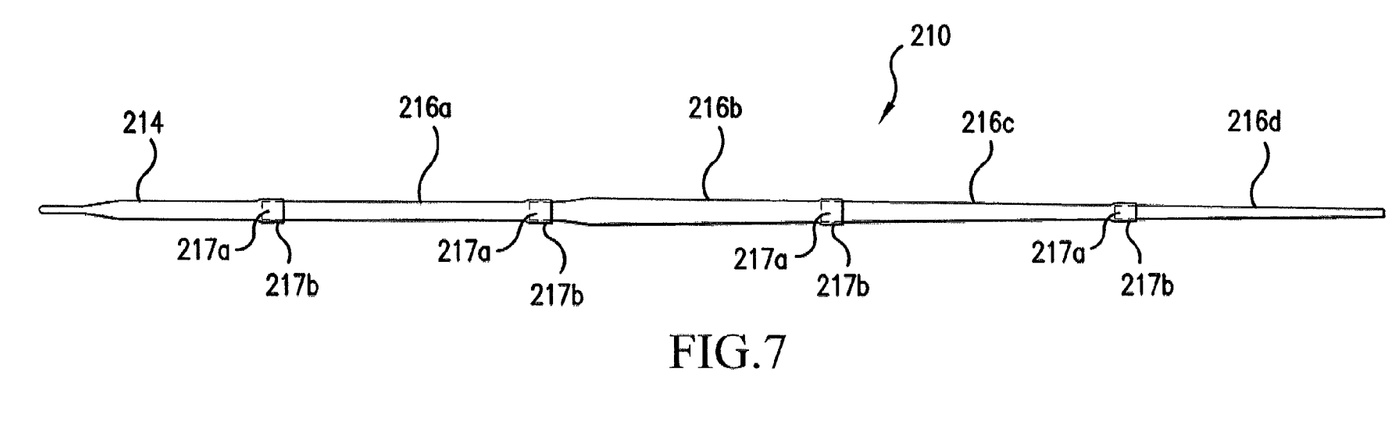
FIG. 7 is a side profile view of a fishing rod according to a third exemplary embodiment of the present invention.

According to a third exemplary embodiment, a fishing rod 210 may be formed in separate pieces that are connected to each other using ferrules. For example, as seen in FIG. 7, fishing rod 210 may include a separate handle portion 214, and one or more sectioned rod portions 216a, 216b, 216c, and 216d. Each of the handle portion 214 and rod portions 216a, 216b, 216c, and 216d may be formed with female and/or male connectors 217a, 217b, respectively, and joined together via friction fits. Alternative means for joining the handle portion 214 and one or more of the rod portions 216a, 216b, 216c, and 216d may include forming internal and/or external threads on the handle portion and rod portions so that they may be threaded together. In addition, one or more of the handle portions 214 and rod portions 216a, 216b, 216c, and 216d may be formed using the bladder molding technique described above.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of forming a fishing rod with at least one integrally formed support, the method comprising:
    providing a bladder over a mandrel;
    wrapping a resin-impregnated material over the bladder to provide a wrapped resin-impregnated material, the wrapped resin-impregnated material having a first end and second end and defining a length extending along a longitudinal axis of the wrapped resin-impregnated material between the first end and the second end;
    removing the mandrel from the wrapped resin-impregnated material;
    folding the wrapped resin-impregnated material onto itself at a location along the longitudinal axis at least once to form a tubular body such that the second end is closer to the first end after folding than prior to folding, wherein folding the wrapped resin-impregnated material forms at least two separate bladder portions and the integrally formed support within the tubular body;
    placing the tubular body into a mold; and
    molding the tubular body to provide the fishing rod with the integrally formed support.

2. The method according to claim 1, wherein each of the bladder portions includes an open end, the method includes sealing one of the open ends and attaching a nozzle to the other open end.

3. The method according to claim 2, wherein molding the tubular body includes supplying compressed air to the nozzle to inflate both bladder portions.

4. The method according to claim 3, wherein molding the tubular body includes heating the mold to cure the tubular body.

5. The method according to claim 4, wherein the mold includes a first and second mold portions and molding the tubular body includes compressing the first and second mold portions together.

6. The method according to claim 1, wherein molding the tubular body includes heating the mold to cure the tubular body.

7. The method according to claim 1, wherein the second end is substantially adjacent the first end after folding the wrapped resin-impregnated material onto itself.

* * * * *